US008573819B2

(12) United States Patent
Okubo et al.

(10) Patent No.: US 8,573,819 B2
(45) Date of Patent: Nov. 5, 2013

(54) VEHICLE HEADLAMP AND VEHICLE HEADLAMP APPARATUS

(75) Inventors: Yasuhiro Okubo, Isehara (JP); Toshiya Abe, Isehara (JP)

(73) Assignee: Ichikoh Industries, Ltd., Isehara-shi (JP)

( * ) Notice: Subject to any disclaimer, the term of this patent is extended or adjusted under 35 U.S.C. 154(b) by 256 days.

(21) Appl. No.: 13/218,023

(22) Filed: Aug. 25, 2011

(65) Prior Publication Data

US 2012/0051071 A1 Mar. 1, 2012

(30) Foreign Application Priority Data

Aug. 26, 2010 (JP) ................................ 2010-189790

(51) Int. Cl.
*B60Q 1/14* (2006.01)
*B60Q 1/06* (2006.01)

(52) U.S. Cl.
USPC ........... 362/465; 362/508; 362/512; 362/516; 362/545

(58) Field of Classification Search
USPC .......................... 362/508, 512, 516, 465, 545
See application file for complete search history.

(56) References Cited

U.S. PATENT DOCUMENTS

| | | | | |
|---|---|---|---|---|
| 6,837,601 | B2 * | 1/2005 | Tatsukawa | 362/512 |
| 2007/0091629 | A1 * | 4/2007 | Fukawa | 362/509 |
| 2007/0147055 | A1 * | 6/2007 | Komatsu | 362/464 |

FOREIGN PATENT DOCUMENTS

| | | | |
|---|---|---|---|
| EP | 2 196 727 | A1 | 6/2010 |
| JP | 2010-140661 | A | 6/2010 |

* cited by examiner

*Primary Examiner* — Stephen F Husar
*Assistant Examiner* — James Cranson, Jr.
(74) *Attorney, Agent, or Firm* — Foley & Lardner LLP

(57) ABSTRACT

The present invention combines control for lighting on/off a right side semiconductor-type light source 5R, control for lighting on/off a left side semiconductor-type light source 5L, and control for moving a movable shade 7 between a first position and a second position via control for driving/stopping the movement mechanism 70 with one another so as to radiate luminous intensity of a light distribution pattern HP1 for high beam having a first function, a light distribution pattern HP2 for high beam having a second function, and a light distribution pattern HP3 for high beam having a third function toward a forward direction of a vehicle 3. As a result, since the present invention includes a set of lamp unit, in comparison with the conventional vehicle headlamp system, the present invention requires a less number of components, and thus downsizing and cost reduction can be achieved accordingly.

4 Claims, 10 Drawing Sheets

VEHICLE HEADLAMP AND VEHICLE HEADLAMP APPARATUS

CROSS-REFERENCE TO RELATED APPLICATIONS

This application claims priority of Japanese Patent Application No. 2010-189790 filed on Aug. 26, 2010. The contents of this application are incorporated herein by reference in their entirety.

BACKGROUND OF THE INVENTION

1. Field of the Invention

The present invention relates to vehicle headlamps each radiating a light distribution pattern for high beam having a plurality of functions toward a forward direction of a vehicle. Further, the present invention relates to a vehicle headlamp apparatus including the vehicle headlamp radiating the light distribution pattern for high beam having the plurality of functions toward the forward direction of the vehicle.

2. Description of the Related Art

A vehicle headlamp and a vehicle headlamp apparatus of these types (hereinafter, referred to as a "vehicle headlamp system") are conventionally known (e.g., Japanese Laid-open Patent No. 2010-140661). Hereinafter, the conventional vehicle headlamp system will be described. The conventional vehicle headlamp system includes two sets of lighting device units (a lighting device unit including a projecting lens, a pair of light emitting elements disposed right and left thereof, a pair of reflectors, and a vertically-disposed double-sided mirror) and two sets of swivel features turning the lighting device unit in a horizontal direction. The conventional vehicle headlamp system combines control for lighting on/off the pair of the light emitting elements with control for driving/stopping the two sets of swivel features so as to each radiate the light distribution pattern for high beam having the plurality of functions toward the forward direction of the vehicle.

However, since the aforementioned conventional vehicle headlamp system needs the two sets of lighting device units and the two sets of swivel features, a large number of components are required, thereby increasing a size of the vehicle headlamp system and a production cost thereof accordingly.

The present invention has been made to solve the aforementioned problems in which the conventional vehicle headlamp system requires the large number of components, thereby increasing the size of the vehicle headlamp system and the production cost thereof accordingly.

SUMMARY OF THE INVENTION

A vehicle headlamp according to first aspect of present invention that radiates a light distribution pattern for high beam having a plurality of functions toward a forward direction of a vehicle, the vehicle headlamp comprising:

a light source holder formed of a vertical wall;

a right side semiconductor-type light source and a left side semiconductor-type light source that are respectively disposed on both right and left side faces of the light source holder;

a right side reflection surface that is formed of a free curved face of a parabola system and whose focal point is located at or near a light emitting center of the right side semiconductor-type light source;

a left side reflection surface that is formed of a free curved face of a parabola system and whose focal point is located at or near a light emitting center of the left side semiconductor-type light source;

a movable shade that is movably disposed between a first position and a second position, cuts off and passes a part of radiation light from the right side semiconductor-type light source and a part of radiation light from the left side semiconductor-type light source; and a movement mechanism that moves the movable shade between the first position and the second position, wherein, the right reflection surface includes a first right side reflection surface for reflecting the radiation light from the right side semiconductor-type light source as a first light distribution pattern for high beam toward the forward direction of the vehicle and a second right side reflection surface for reflecting the radiation light from the right side semiconductor-type light source as a second light distribution pattern for high beam toward the forward direction of the vehicle;

the left reflection surface includes a first left side reflection surface for reflecting the radiation light from the left side semiconductor-type light source as a third light distribution pattern for high beam toward the forward direction of the vehicle and a second left side reflection surface for reflecting the radiation light from the left side semiconductor-type light source as a fourth light distribution pattern for high beam toward the forward direction of the vehicle;

when the movable shade is located at the first position, the radiation light incident from the right side semiconductor-type light source to the second right side reflection surface and the radiation light incident from the left side semiconductor-type light source to the second left side reflection surface is cut off by the movable shade; and when the movable shade is located at the second position, the radiation light from the right side semiconductor-type light source enters the second right side reflection surface, and also the radiation light from the left side semiconductor-type light source enters the second left side reflection surface.

The vehicle headlamp according to second aspect of the present invention, further comprising a swivel device that rotates about a vertical axis the light source holder, the right side semiconductor-type light source, the left side semiconductor-type light source, the right side reflection surface, the left side reflection surface, the movable shade, and the movement mechanism.

The vehicle headlamp according to third aspect of the present invention, further comprising a light adjusting control unit that light-adjusts and controls the right side semiconductor-type light source and the left side semiconductor-type light source so as to gradually increase and decrease luminous intensity of the light distribution patterns for high beam.

The vehicle headlamp apparatus according to fourth aspect of the present invention comprising:

a vehicle headlamp according to claims 1 to 3;

a detection unit that detects a leading vehicle and an oncoming vehicle in a forward direction of a vehicle; and a control unit that outputs a control signal to the vehicle headlamp based on a detection signal from the detection unit.

In accordance with a vehicle headlamp according to a first aspect of the present invention, control for lighting on/off the right semiconductor-type light source, control for lighting on/off the left semiconductor-type light source, and control for moving a movable shade between a first position and a second position via control for driving/stopping a movement mechanism are combined with one another so as to radiate the light distribution pattern having a plurality of functions toward a forward direction of a vehicle.

Particularly, the vehicle headlamp according to the first aspect of the present invention includes a set of lighting device unit (lamp unit) including, more specifically, a light source holder, a right side semiconductor-type light source, a left side semiconductor-type light source, a right side reflection surface, a left side reflection surface, a movable shade, and a movement mechanism. Thus, in comparison with the conventional vehicle headlamp system that requires two sets of the lighting units and two sets of the swivel features, the vehicle headlamp according to the present embodiment requires a less number of components, and thus downsizing and cost reduction can be achieved accordingly.

In accordance with the vehicle headlamp according to a second aspect of the present invention, since a swivel device is included therein, the light distribution pattern for high beam having the plurality of functions can be turned right/left along with the vehicle turning right/left. As a result, the vehicle headlamp can reliably illuminate a winding road and an intersection toward the forward direction of the vehicle, thereby contributing to safe driving.

In accordance with the vehicle headlamp according to a third aspect of the present invention, since a light adjusting control unit is included therein, luminance of the light distribution pattern for high beam having the plurality of functions can be gradually increased or gradually decreased. As a result, when the light distribution pattern for high beam having the plurality of functions is switched or lit on/off, a driver and people present near the vehicle are not made uncomfortable, thereby obtaining people-friendly illumination.

In accordance with the vehicle headlamp apparatus according to a fourth aspect of the present invention, by means for solving the aforementioned problems, an effect similar to the vehicle headlamp described in any one of the claims 1 to 3 below can be achieved.

DESCRIPTION OF THE PREFERRED EMBODIMENTS

Hereinafter, based on the FIGS, an embodiment of the vehicle headlamp system according to the present invention will be described in detail. However, it should be noted that the present invention is not limited by the present embodiment. In the figures, a reference symbol "VU-VD" indicates an upward-downward vertical line in a screen, and a reference symbol "HL-HR" indicates a rightward-leftward horizontal line therein. In the specification and the scopes of claims, the terms "top", "bottom", "front", "rear", "right", and "left" indicate the top, bottom, front, rear, right, and left of a vehicle (an automobile) when the vehicle headlamp according to the present invention is mounted thereon. Further, FIGS. 7A, 8A, 9A, 10A, and 11A are front elevation views of reflection surfaces. FIGS. 7B, 8B, 9B, 10B, and 11B are exemplary figures showing light distribution patterns for high beam obtained when radiation light from a semiconductor-type light source is reflected on a reflection surface. FIGS. 7C, 8C, 9C, and 10C are exemplary views showing states where the light distribution pattern for high beam obtained in FIGS. 7B, 8B, 9B, 10B, and 11B respectively is synthesized (overlapped) with each light distribution pattern for low beam.

Embodiment (Configuration of the Vehicle Headlamp System)

Figure 1:
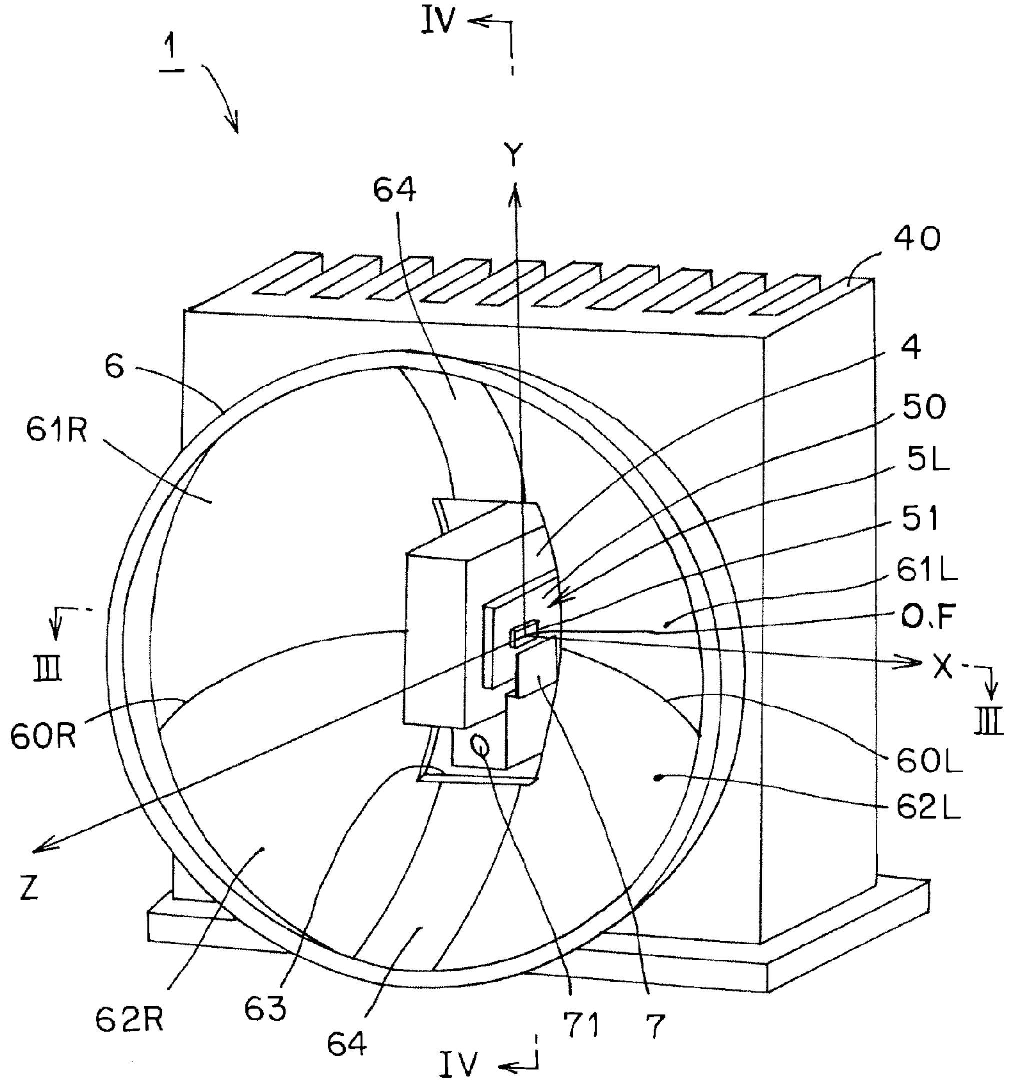
FIG. 1 is a perspective view of essential parts showing an embodiment of a vehicle headlamp system according to the present invention.
Figure 2:
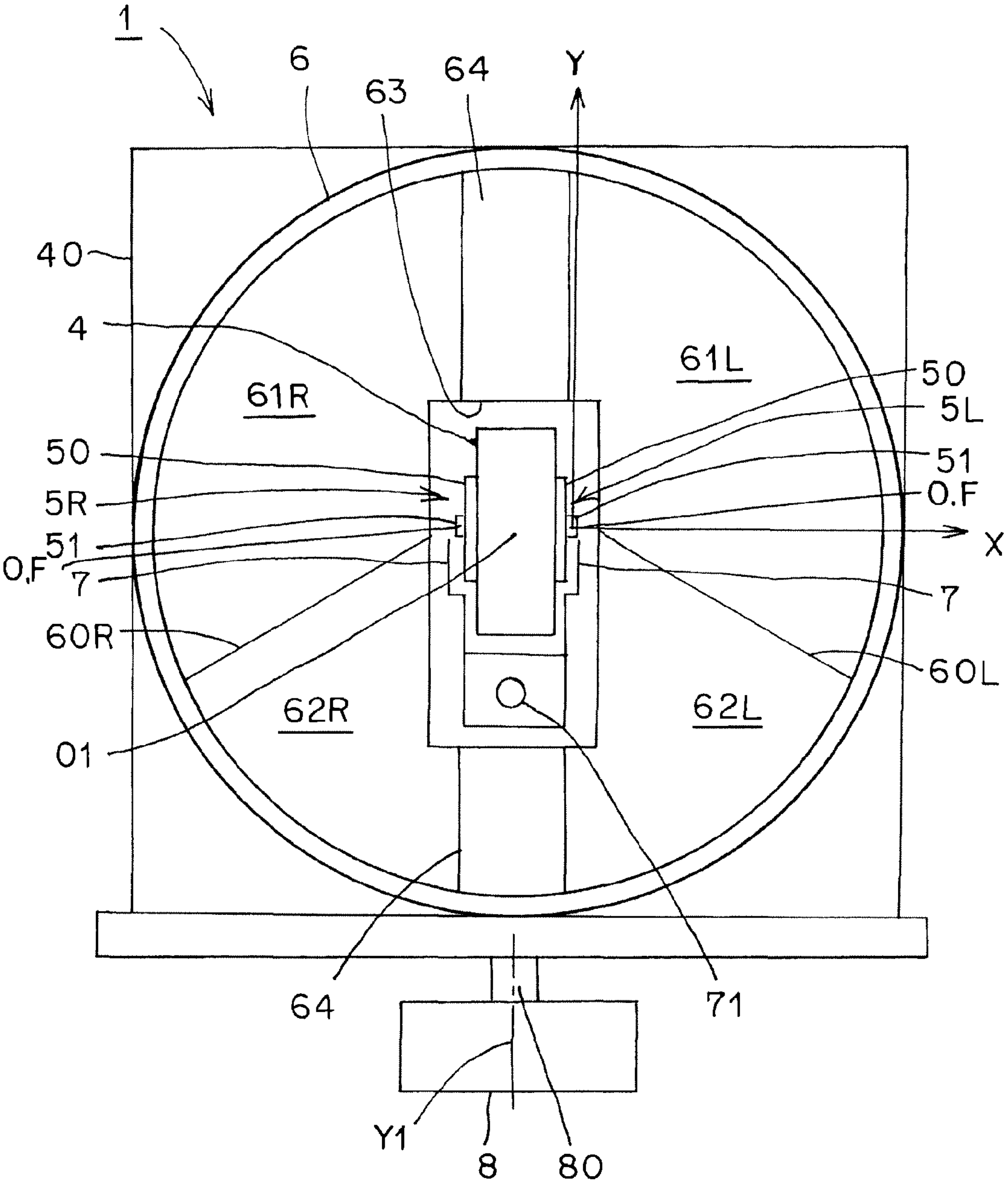
FIG. 2 is a front elevation view of essential parts, similarly.
Figure 3:
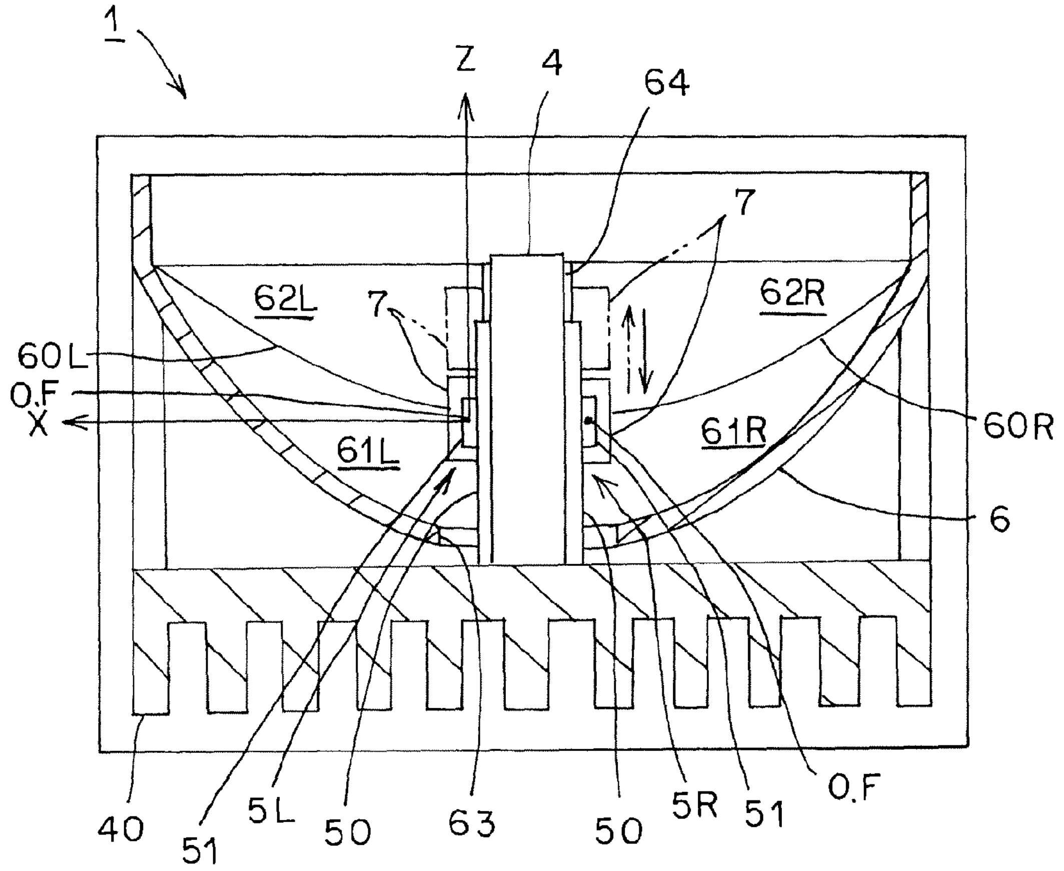
FIG. 3 is a horizontal cross-sectional view taken along the line III-III of FIG. 1, similarly.
Figure 4:
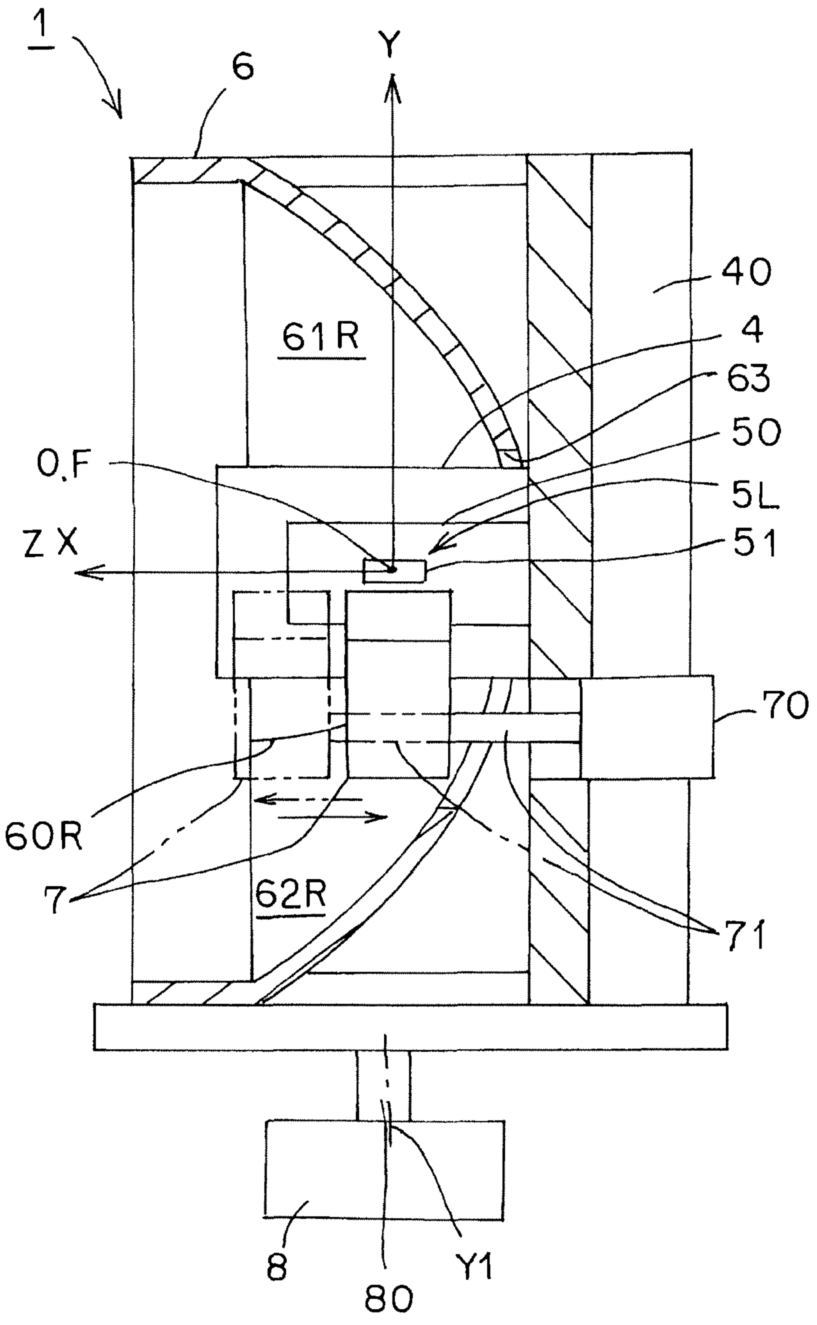
FIG. 4 is a vertical cross-sectional view taken along the line IV-IV of FIG. 1, similarly.
Figure 5:
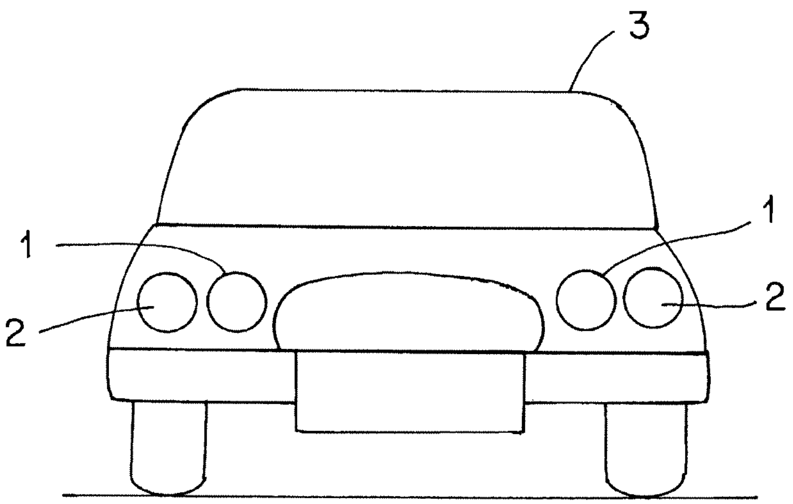
FIG. 5 is a front elevation view of a vehicle including a vehicle headlamp system, similarly.

A configuration of a vehicle headlamp system according to the present embodiment will be described herebelow. FIGS. 1 to 5 show a vehicle headlamp 1 for high beam and a vehicle headlamp 2 for low beam that are the vehicle headlamps included in a vehicle headlamp system according to the present embodiment. As shown in FIG. 5, each of the vehicle headlamp 1 for high beam and the vehicle headlamp 2 for low beam is mounted at both sides of right and left at a front portion of a vehicle 3 to constitute a vehicle headlamp of a four-light type.

Figure 9A:
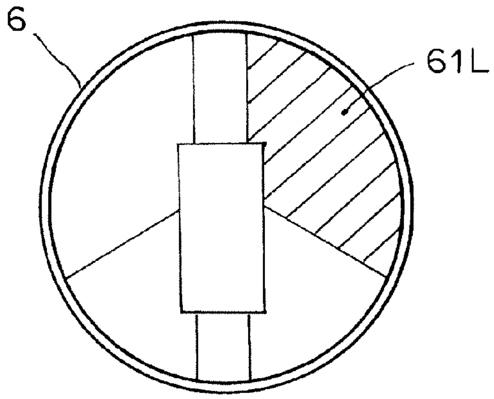
FIGS. 9A, 9B, and 9C are explanatory views showing a third control state, similarly.
Figure 10A:
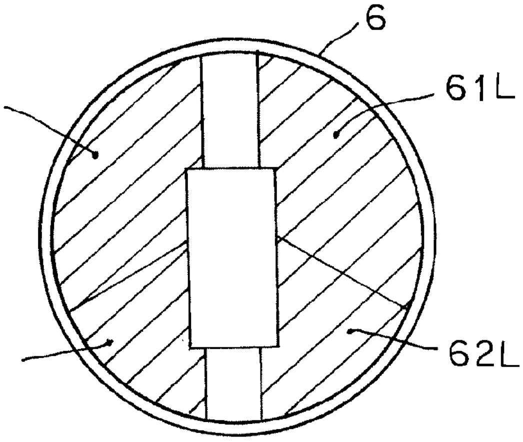
FIGS. 10A, 10B, and 10C are explanatory views showing a fourth control state, similarly.
Figure 10B:
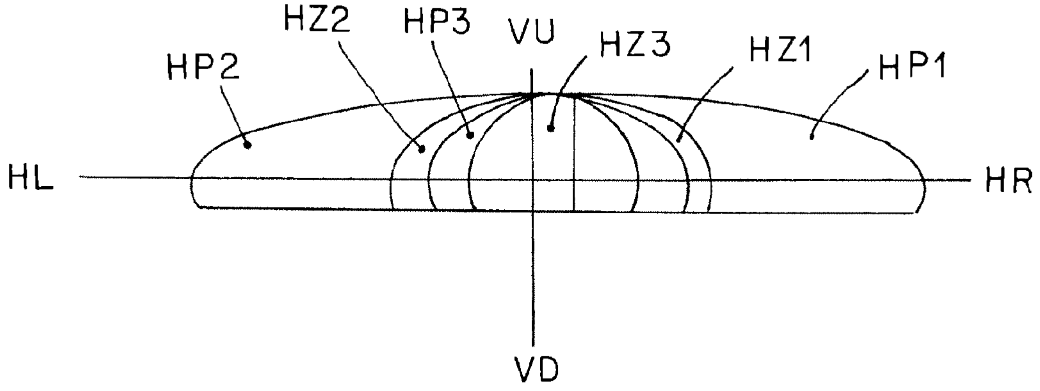
Figure 10C:
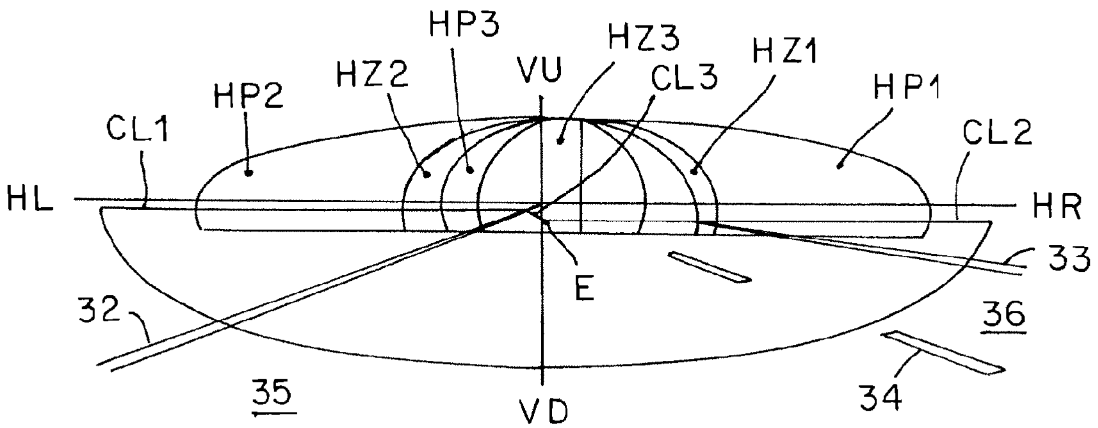
Figure 11A:
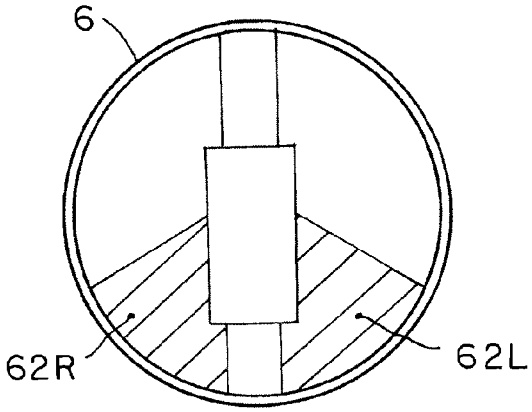
FIG. 11A is an explanatory view showing a case where radiation light from a right side semiconductor-type light source and a left side semiconductor-type light source is reflected on a second right side reflection surface and a second left side reflection surface, similarly.
Figure 11B:
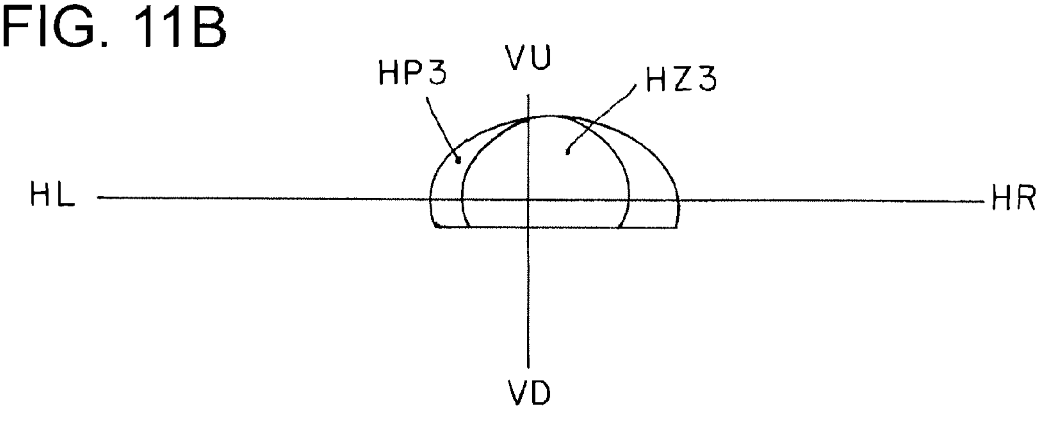
FIG. 11B is an explanatory view showing a light distribution pattern obtained in the case described in FIG. 11A, similarly.

The vehicle headlamp 2 for low beam radiates the light distribution pattern LP for low beam shown in FIGS. 7 to 10 toward a forward direction of a vehicle. Further, the vehicle headlamp 1 for high beam radiates the light distribution pattern for high beam having a plurality of functions toward the forward direction of the vehicle. More specifically, the vehicle headlamp 1 for high beam radiates a light distribution pattern HP1 for high beam of a first function as shown in FIGS. 8A, 8B, 8C, a light distribution pattern HP2 for high beam of a second function as shown in FIGS. 9A, 9B, 9C, and a light distribution pattern HP3 for high beam of a third function as shown in FIG. 11B toward the front direction of the vehicle together with the light distribution pattern LP for low beam radiated from the vehicle headlamp 2 for low beam.

As shown in FIGS. 7 to 10, the light distribution pattern LP for low beam includes an upper horizontal cutoff line CL1 at a cruising lane 35 side, a lower horizontal cutoff line CL2 at an opposite lane 36 side, an oblique cutoff line CL3 at a center (between the upper horizontal cutoff line CL1 and the lower horizontal cutoff line CL2), and an elbow point "E" that is an intersection point of the lower horizontal cutoff line CL2 and the oblique cutoff line CL3.

Figure 8A:
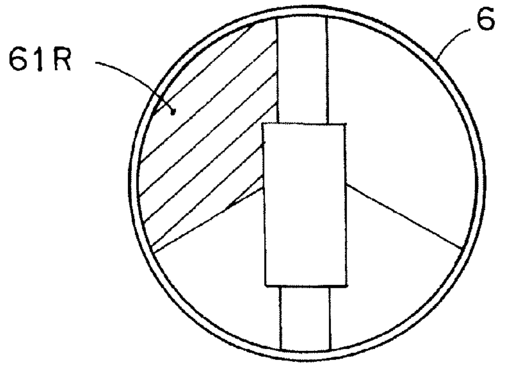
FIGS. 8A, 8B, and 8C are explanatory views showing a second control state, similarly.
Figure 8B:
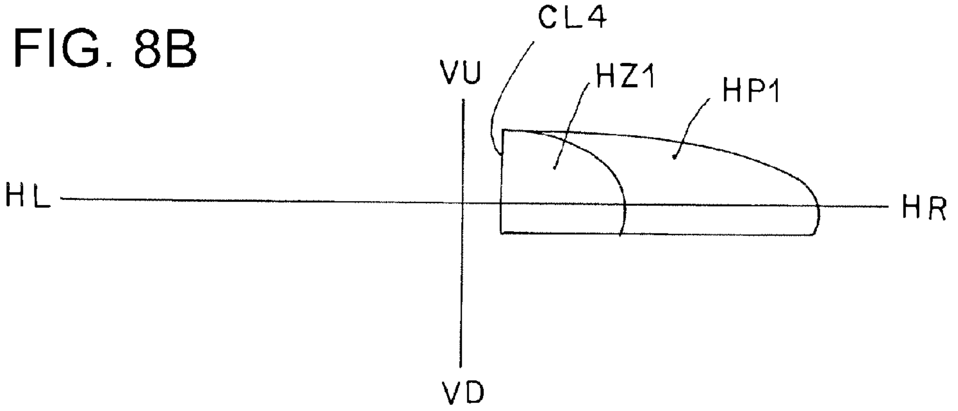
Figure 8C:
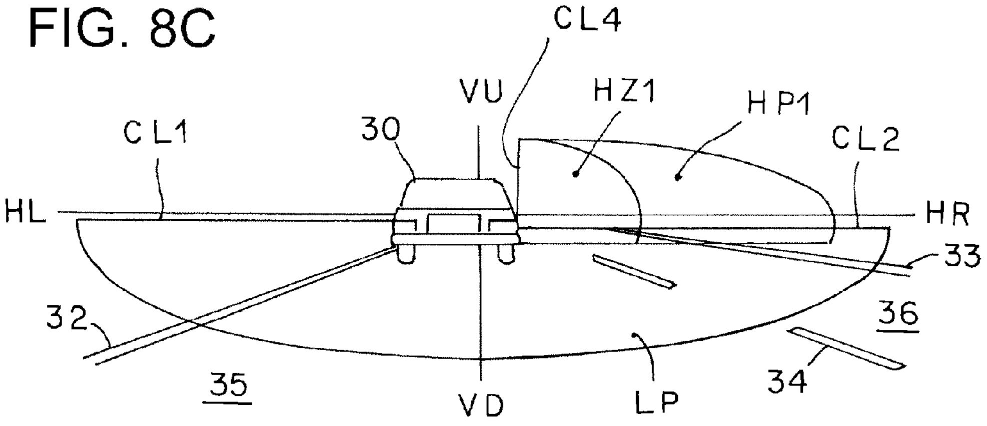

As shown in FIGS. 8B and 8C, the light distribution pattern HP1 for high beam having the first function illuminates a wide area from a substantially right side to a right side with respect to the upward-downward vertical line VU-VD and an area from an upper side to a substantially lower side with respect to the rightward-leftward horizontal line HL-HR. As shown in FIGS. 8B and 8C, the light distribution pattern HP1 for high beam having the first function includes a left side vertical cutoff line CL4 at a substantially right side with respect to the upward-downward vertical line VU-VD, and also a hot zone HZ1 (hot spot, high luminous intensity zone) close to the upward-downward vertical line VU-VD. As shown in FIG. 8C, the light distribution pattern HP1 for high beam having the first function can illuminate the wide area toward a road shoulder 33 of an opposite lane side. Further, the left side vertical cutoff line CL4 can prevent a leading vehicle 30 from being disturbed by the light radiated from the vehicle 3. Furthermore, the hot zone HZ1 enables the opposite lane 36 to be illuminated further away.

Figure 9B:
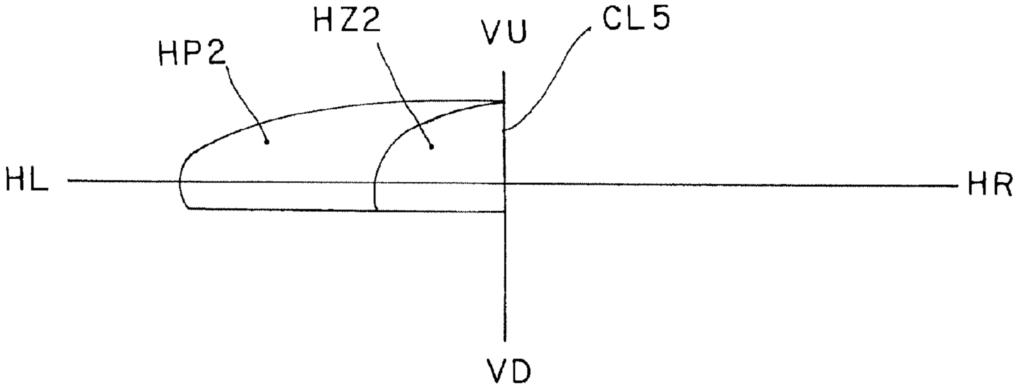
Figure 9C:
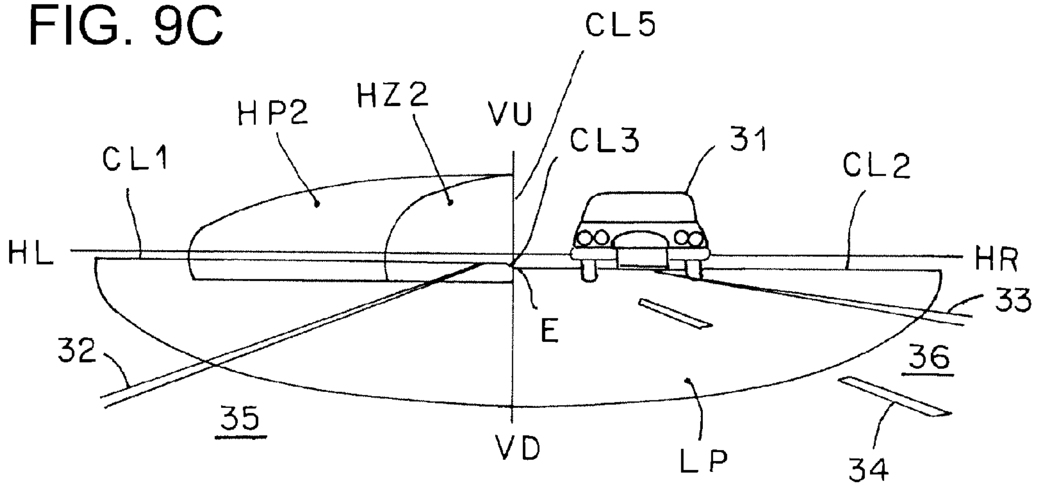

As shown in FIGS. 9B and 9C, the light distribution pattern HP2 for high beam having the second function illuminates a wide area from the upward-downward vertical line VU-VD to the left side and an area from an upper side to a substantially lower side with respect to the rightward-leftward horizontal line HL-HR. As shown in FIGS. 9B and 9C, the light distribution pattern HP2 for high beam having the second function includes a right side vertical cutoff line CL5 on the upward-downward vertical line VU-VD, and also a hot zone HZ2 (hot spot, high luminous intensity zone) close to the upward-downward vertical line VU-VD. As shown in FIG. 9C, the light distribution pattern HP2 for high beam having the second function can illuminate the wide area toward a road shoulder 32 of an opposite lane side. Further, the right side vertical cutoff line CL5 can prevent an oncoming vehicle 31 from being disturbed by the light radiated from the vehicle 3. Furthermore, the hot zone HZ2 illuminates the cruising lane 35 further away.

As shown in FIG. 11B, the light distribution pattern HP3 for high beam having the third function illuminates a small area from the upward-downward vertical line VU-VD to each of both right and left sides and an area from an upper side to a substantially lower side with respect to the rightward-leftward horizontal line HL-HR. As shown in FIG. 11B, the light distribution pattern HP3 having the third function includes a hot zone HZ3 (hot spot, high luminous intensity zone) close to the upward-downward vertical line VU-VD. As shown in FIGS. 10B and 10C, the light distribution pattern HP3 for high beam having the third function can illuminate the cruising lane 35 and the opposite lane 36 further away.

FIGS. 7 to 11 include the road shoulder 32 of the cruising lane side (left side), a road shoulder 33 of the opposite lane side (right side), and a center line 34. The light distribution patterns shown in FIGS. 7C to 11 are used for driving on the left. Therefore, for driving on the right, the light distribution pattern is rightward-leftward reversed.

Figure 6:
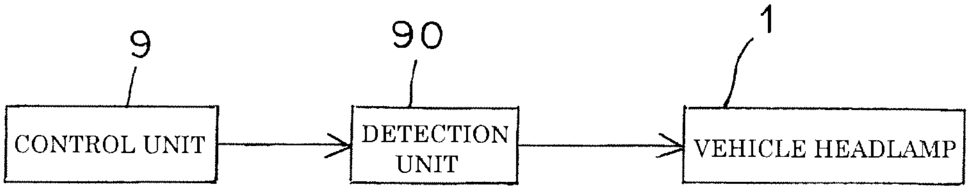
FIG. 6 is a block diagram showing constituent component of a vehicle headlamp apparatus, similarly.

The vehicle headlamp 1 for high beam includes a light source holder 4, a heatsink member 40, a right side semiconductor-type light source 5R, a left side semiconductor-type light source 5L, a reflector 6 including right side reflection surfaces 61R, 62R, left side reflection surfaces 61L, 62L, a movable shade 7, a movement mechanism 70, a swivel device 8, a light adjusting control unit (refer to a control unit 90 in FIG. 6, a lamp housing, and a lamp lens (not shown)(e.g., transparent outer lens).

A lamp unit includes the light source holder 4, the heatsink member 40, the right side semiconductor-type light source 5R, the left side semiconductor-type light source 5L, the right side reflection surfaces 61R, 62R, the left side reflection surfaces 61L, 62L, and the reflector 6, the movable shade 7, the movement mechanism 70, the swivel device 8, and the light adjusting control unit. The lamp unit is disposed in a lighting room divided by the lamp housing and the lamp lens via, for example, an optical axis adjusting mechanism. In addition to the lamp unit, in the lighting room, a lamp unit of the vehicle headlamp 2 for low beam or other lamp units, such as a fog lamp, a cornering lamp, a clearance lamp, or a turn signal lamp, may be disposed. Further, the light adjusting control unit may be disposed outside the lighting room.

The light source holder 4 is formed in a vertical wall shape including both right and left side faces and a rear face. The light source holder 4 is made of, for example, a resin member or a metal member having a high thermal conductivity. The heatsink member 40 is formed in a cuboid shape including a foreside face (front face) and also in a fin-like shape from a front portion to a rear portion. Similarly to the light source holder 4, the heatsink member 40 is made of, for example, the resin member or the metal member having the high thermal conductivity. The rear face of the light source holder 4 is fixed onto the front face of the heatsink member 40.

On the right side face of the light source holder 4, the right side semiconductor-type light source 5R is disposed, and, on the left side face thereof, the left side semiconductor-type light source 5L is disposed. The semiconductor-type light sources 5R, 5L each include a substrate 50 fixed onto the light source holder 4, a light emitting chip (not shown) disposed onto the substrate 50, and a light transmitting sealing member 51 that seals the light emitting chip. One or more light emitting chips (according to the present embodiment, two light emitting chips) are included in the semiconductor-type light sources 5R, 5L.

The sealing member 51 forms a light emitting portion of each of the semiconductor-type light sources 5R, 5L. The sealing member 51 is formed in a cuboid shape. A center "O" of the sealing member 51 coincides with a light emitting center "O" of each of the semiconductor-type light sources 5R, 5L. A horizontal axis "X", a vertical axis (perpendicular axis) "Y", and a reference optical axis "Z" (reference optical axes of the right side reflection surfaces 61R, 62R and the left side reflection surfaces 61L, 62L) that pass through the light emitting center "O" of the semiconductor-type light sources 5R, 5L constitute orthogonal coordinates (X-Y-Z orthogonal coordinate system).

The reflector 6 includes, for example, a resin member that does not transmit the light therethrough. The reflector 6 is formed in a rotating paraboloidal shape including an axis (axis in parallel with the reference optical axis "Z") passing through a point O1 as a rotation axis. A front side of the reflector 6 is open in a round shape. A rear side of the reflector 6 is closed. At a medium portion of the closed portion of the reflector 6, a rectangular window portion 63 that is vertically long is provided. The light source holder 4 is inserted into the window portion 63 of the reflector 6, which is fixed to and held by the heatsink member 40 at an outer side (rear side) of the closed portion.

Of an inner side (front side) of the closed portion of the reflector 6, at the right and left sides of the window portion 63, the right side reflection surfaces 61R, 62R and the left side reflection surfaces 61L, 62L are disposed. The right side reflection surfaces 61R, 62R and the left side reflection surfaces 61L, 62L formed of free curved faces (NURBS curving faces) of a parabola system include a reference focal point (simulated focal point) "F" and the reference optical axis (simulated optical axis) "Z". The reference focal point "F" is positioned at or near the light emitting center "O" of the semiconductor-type light sources 5R, 5L. Between the right side reflection surfaces 61R, 62R and the left side reflection surfaces 61L, 62L, at both upper and lower sides of the window portion 63 at the inner side (front side) of the closed portion of the reflector 6, a non-reflection surface 64 is disposed.

The right side reflection surfaces 61R, 62R are formed of a first right side reflection surface 61R and a second right side reflection surface 62R respectively. The first right side reflection surface 61R reflects the radiation light from the right side semiconductor-type light source 5R toward the forward direction of the vehicle 3 as a first light distribution pattern HP1 for high beam, in other words, the light distribution pattern HP1 for high beam having the first function shown in FIGS. 8A, 8B, 8C. The second right side reflection surface 62R reflects the radiation light from the right side semiconductor-type light source 5R toward the forward direction of the vehicle 3 as a second light distribution pattern HP3 for high beam, in other words, the light distribution pattern HP3 for high beam having the third function shown in FIGS. 11A, 11B.

The left side reflection surfaces 61L, 62L are formed of a first left side reflection surface 61L and a second left side reflection surface 62L respectively. The first left side reflection surface 61L reflects the radiation light from the left side semiconductor-type light source 5L toward the forward direction of the vehicle 3 as a third light distribution pattern HP2 for high beam, in other words, the light distribution pattern HP2 for high beam having the second function shown in FIGS. 9A, 9B, 9C. The second left side reflection surface 62L reflects the radiation light from the left side semiconductor-type light source 5L toward the forward direction of the vehicle 3 as a fourth light distribution pattern HP3 for high beam, in other words, the light distribution pattern HP3 for high beam having the third function shown in FIGS. 11A, 11B.

The first right side reflection surface 61R, the second right side reflection surface 62R, the first left side reflection surface 61L, the second left side reflection surface 62L are each divided into a plurality of blocks (segments). Each block controls a reflected image of the light emitting portion of the semiconductor-type light sources 5R, 5L to form the light distribution pattern HP1 for high beam having the first function, the light distribution pattern HP2 for high beam having the second function, and the light distribution pattern HP3 for high beam having the third function, and then radiates them toward the forward direction of the vehicle 3.

A boundary line 60R is disposed between the first right side reflection surface 61R and the second right side reflection surface 62R, which are the right side reflection surfaces 61R, 62R. A boundary line 60L is disposed between the first left side reflection surface 61L and the second left side reflection surface 62L, which are the left side reflection surfaces 61L, 62L.

The movable shade 7 is movably disposed between a first position (position indicated with solid lines in FIGS. 3, 4) and a second position (position indicated with two-dot chain lines in FIGS. 3, 4) via the movement mechanism 70. The movable shade 7 is made of a member that does not transmit the light therethrough and has a plate structure (according to the present embodiment, thin steel plate structure made of a flat plate) whose production cost is inexpensive. The movable shade 7 includes a front face plate portion and both right and left side face plate portions that are folded and bent orthogonally from the both right and left sides of the front face plate portion. Upper end portions of the both right and left side face plate portions of the movable shade 7 face a lower end portion of the light emitting portion (sealing member 51) of each of the semiconductor-type light sources 5R, 5L.

The movable shade 7 cuts off or passes a part of the light radiated form the right side semiconductor-type light source 5R and a part of the radiation light from the left side semiconductor-type light source 5L. More specifically, when being located at the first position, the movable shade 7 cuts off the radiation light incident from the right side semiconductor-type light source 5R to the second right side reflection surface 62R and the radiation light incident from the left side semiconductor-type light source 5L to the second left side reflection surface 62L. Further, when being located at the second position, the movable shade 7 causes the radiation light from the right side semiconductor-type light source 5R to enter the second right side reflection surface 62R and the radiation light from the left side semiconductor-type light source 5L to enter the second left side reflection surface 62L.

The movement mechanism 70 moves the movable shade 7 between the first position and the second position. According to the present embodiment, a solenoid is employed for the movement mechanism 70. The movement mechanism 70 is fixed to the heatsink member 40. A front end (leading end) of a movement axis (plunger) 71 of the movement mechanism 70 is fixed to the front face plate portion of the movable shade 7. When the movement mechanism 70 is in a stop state (when current is not applied), a returning spring (not shown) moves the movable shade 7 located at the second position in a solid line arrow direction as shown in FIGS. 3, 4 to locate at the first position. Further, when the movement mechanism 70 is in a driving state (when the current is applied), against a spring force of the returning spring, the movement mechanism 70 moves the movable shade 7 located at the first position in a two-dot chain line arrow direction as shown in FIGS. 3, 4 to locate at the second position.

The swivel device 8 rotates about the vertical axis Y1 the light source holder 4, the heatsink member 40, the right side semiconductor-type light source 5R, the left side semiconductor-type light source 5L, the reflector 6 including the right side reflection surfaces 61R, 62R and the left side reflection surfaces 61L, 62L, the movable shade 7, and the movement mechanism 70 (hereinafter, referred to as a "sub lamp unit"). The vertical axis of the swivel device 8, which is a swivel rotation axis line, is in parallel with a vertical axis "Y" of the orthogonal coordinates.

The swivel device 8 includes, for example, a stepping motor, a rotation force transmitting mechanism, and a swivel axis 80. The swivel device 8 is fixed to the lamp housing via the optical axis adjusting mechanism. The upper end (leading end) of the swivel axis 80 is fixed to the heatsink member 40.

The swivel device 8 is connected to a control device (not shown) via a steering angle sensor (not shown), for example. When a detection signal of the steering angle sensor is input to the control device, the control device outputs a control signal to the swivel device 8. As a result, the swivel device 8 is driven to rotate the sub lamp unit about the vertical axis Y1 along with a right/left rotation of the vehicle 3.

The light adjusting control unit is connected to each of the right side semiconductor-type light source 5R and the left side semiconductor-type light source 5L. The light adjusting control unit controls the right side semiconductor-type light source 5R and the left side semiconductor-type light source 5L to adjust the light so as to gradually increase or decrease the luminous intensity of the light distribution patterns HP1, HP2, and HP3 for high beam. The light adjusting control is performed on the right side semiconductor-type light source 5R and the left side semiconductor-type light source 5L, for example, by decreasing or increasing a duty ratio of a pulse width of "on" or the duty ratio of a pulse width of "off" in binary system pulse width modulation.

A vehicle headlamp system includes the vehicle headlamp 1 for high beam, a detection unit 9 for detecting the leading vehicle 30 and the oncoming vehicle 31, and a control unit 90 for outputting the control signal to the vehicle headlamp 1 for high beam based on the detection signal from the detection unit 9. The control unit 90 may also serve as the control device of the swivel device 8.

The detection unit 9 outputs to the control unit 90 a first detection signal when the leading vehicle 30 and the oncoming vehicle 31 are detected in the forward direction of the vehicle 3, a second detection signal when the leading vehicle 30 is detected and the oncoming vehicle 31 is not detected therein, a third detection signal when the leading vehicle 30 is not detected and the oncoming vehicle 31 is detected, and a fourth detection signal when the leading vehicle 30 and the oncoming vehicle 31 are not detected.

The control unit 90 includes the light adjusting control unit. The control unit 90 outputs to the vehicle headlamp 1 for high beam a first control signal based on the first detection signal from the detection unit 9, a second control signal based on the second detection signal from the detection unit 9, a third control signal based on the third detection signal from the detection unit 9, and a fourth control signal based on the fourth detection signal from the detection unit 9.

The vehicle headlamp 1 for high beam controls lighting on/off the right side semiconductor-type light source 5R and the left side semiconductor-type light source 5L and driving/stopping the movement mechanism 70 in accordance with the control signal from the control unit 90 based on the detection signal from the detection unit 9. More specifically, the first control signal from the control unit 90 controls lighting off the right side semiconductor-type light source 5R and the left side semiconductor-type light source 5L, and also stopping the movement mechanism 70. The second control signal from the control unit 90 controls lighting on the right side semiconductor-type light source 5R and lighting off the left side semiconductor-type light source 5L, and also stopping the movement mechanism 70. The third control signal from the control unit 90 controls lighting off the right side semiconductor-type light source 5R and the left side semiconductor-type light source 5L, and also stopping the movement mechanism 70. The fourth control signal from the control unit 90 controls lighting on the right side semiconductor-type light source 5R and the left side semiconductor-type light source 5L, and also driving the movement mechanism 70.

(Operation of the Vehicle Headlamp System)

The vehicle headlamp system according to the present embodiment is constituted as described above, its operations will be described herebelow.

As shown in FIGS. 7 to 10, the light distribution pattern LP for low beam is radiated from the vehicle headlamp 2 for low beam toward the forward direction of the vehicle 3.

Figure 7A:
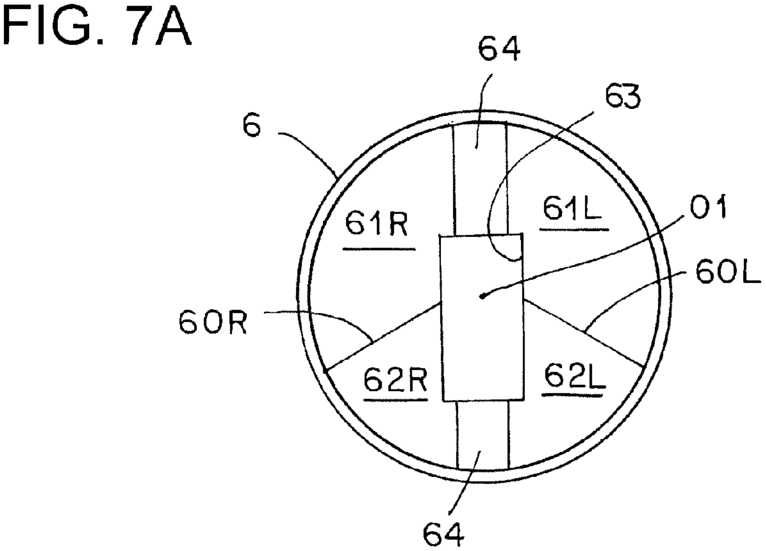
FIGS. 7A, 7B, and 7C are explanatory views showing a first control state, similarly.
Figure 7B:
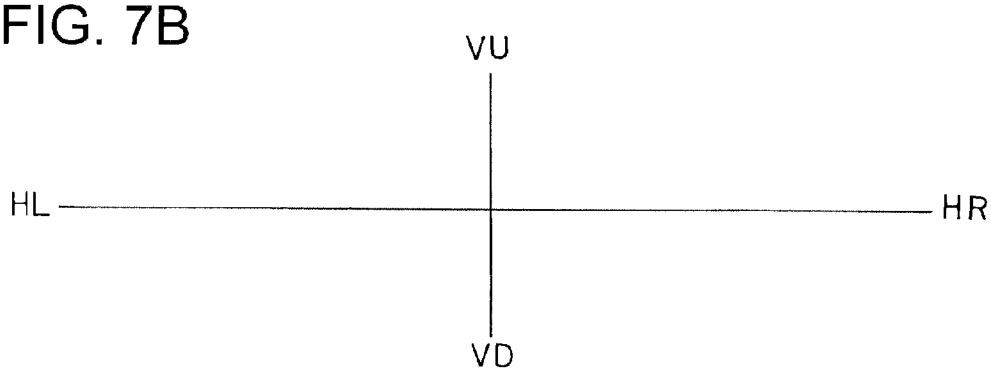
Figure 7C:
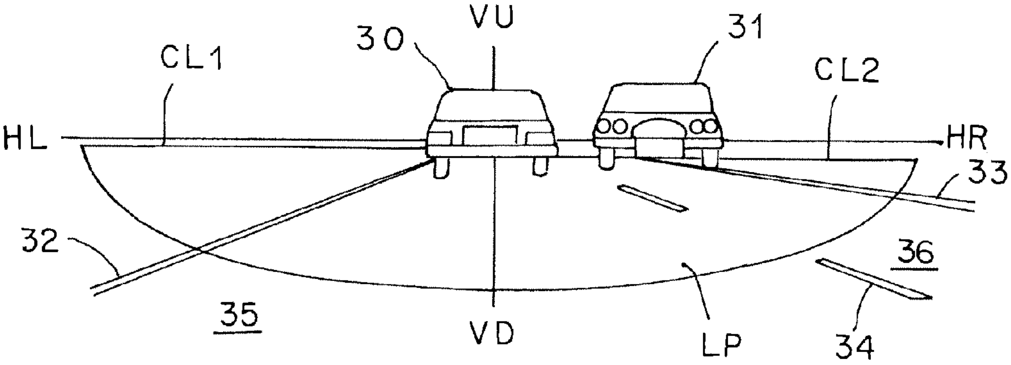

As shown in FIG. 7C herein, when the leading vehicle 30 and the oncoming vehicle 31 are detected in the forward direction of the vehicle 3, the detection unit 9 outputs the first detection signal to the control unit 90, and then the control unit 90 outputs the first control signal to the vehicle headlamp 1 for high beam. Accordingly, the right side semiconductor-type light source 5R and the left side semiconductor-type light source 5L of the vehicle headlamp 1 for high beam are lit off and also the movement mechanism 70 is stopped. With this arrangement, as shown in FIG. 7A, the light is not reflected from the right reflection surfaces 61R, 62R and the left reflection surfaces 61L, 62L. Thus, as shown in FIG. 7B, the light distribution pattern for high beam is not radiated toward the forward direction of the vehicle 3. As a result, as shown in FIG. 7C, only the light distribution pattern LP for low beam is radiated toward the forward direction of the vehicle 3 from the vehicle headlamp 2 for low beam. More specifically, the vehicle headlamp system of the present embodiment can prevent the leading vehicle 30 and the oncoming vehicle 31 in the forward direction of the vehicle 3 from being disturbed by the light radiated from the vehicle 3, thereby contributing to safe driving.

Further, as shown in FIG. 8C, when the leading vehicle 30 is detected and the oncoming vehicle 31 is not detected in the forward direction of the vehicle 3, the detection unit 9 outputs the second detection signal to the control unit 90, and then the control unit 90 outputs the second control signal to the vehicle headlamp 1 for high beam. Accordingly, the right side semiconductor-type light source 5R of the vehicle headlamp 1 for high beam is controlled to be lit on, the left side semiconductor-type light source 5L thereof is controlled to be lit off, and also the movement mechanism 70 is controlled to be stopped. With this arrangement, as shown in FIG. 8A, since a part of the radiation light from the right side semiconductor-type light source 5R is reflected on the first right side reflection surface 61R (reflection surface that is a shaded area shown in FIG. 8A), the light is reflected from the first right side reflection surface 61R. On the other hand, since the radiation light incident to the second right side reflection surface 62R from the right side semiconductor-type light source 5R is cut off by the movable shade 7 located at the first position, the light is not reflected from the second right side reflection surface 62R. Further, since the left side semiconductor-type light source 5L has been lit off, the light is not reflected from the left side reflection surfaces 61L, 62L. Thus, as shown in FIG. 8B, the light distribution pattern HP1 for high beam having the first function providing the left side vertical cutoff line CL4 and the first hot zone HZ1 is radiated toward the forward direction of the vehicle 3. As a result, as shown in FIG. 8C, the light distribution pattern HP1 for high beam having the first function and the light distribution pattern LP for low beam are radiated from the vehicle headlamp 1 for high beam and the vehicle headlamp 2 for low beam respectively toward the forward direction of the vehicle 3. More specifically, the light distribution pattern HP1 for high beam having the first function can illuminate a wide area up to the road shoulder 33 of the opposite lane side. Further, the left side vertical cutoff line CL4 prevents the leading vehicle 30 from being disturbed by the radiation light from the vehicle 3. Furthermore, the hot zone HZ1 can illuminate the opposite lane 36 further away, thereby contributing to safe driving.

As shown in FIG. 9C, when the leading vehicle 30 is not detected and the oncoming vehicle 31 is detected in the forward direction of the vehicle 3, the detection unit 9 outputs the third detection signal to the control unit 90, and then the detection unit 90 outputs the third control signal to the vehicle headlamp 1 for high beam. Accordingly, the left side semiconductor-type light source 5L of the vehicle headlamp 1 for high beam is controlled to be lit on, and the right side semiconductor-type light source 5R is controlled to be lit off, and also the movement mechanism 70 is controlled to be stopped. With this arrangement, as shown in FIG. 9A, since a part of the radiation light from the left side semiconductor-type light source 5L is reflected on the first left side reflection surface 61L (reflection surface that is a shaded area in the FIG. 9A), the light is not reflected from the first left side reflection surface 61L. On the other hand, since the radiation light incident to the second left side reflection surface 62L from the left side semiconductor-type light source 5L is cut off by the movable shade 7 located at the first position, the light is not reflected from the second left side reflection surface 62L. Further, since the right side semiconductor-type light source 5R has been lit off, the light is not reflected on the right side reflection surfaces 61R, 62R. Thus, as shown in FIG. 9B, the light distribution pattern HP2 for high beam having the second function providing the right side vertical cutoff line CL5 and the second hot zone HZ2 is radiated toward the forward direction of the vehicle 3. As a result, as shown in FIG. 9C, the light distribution pattern HP2 for high beam having the second function and the light distribution pattern LP for low beam are radiated toward the forward direction of the vehicle 3 from the vehicle headlamp 1 for high beam and the vehicle headlamp 2 for low beam respectively. More specifically, the light distribution pattern HP2 for high beam having the second function can illuminate the wide area up to the road shoulder 32 of the cruising lane side. Further, the right side vertical cutoff line CL5 prevents the oncoming vehicle 31 from being disturbed by the light radiated from the vehicle 3. Furthermore, the hot zone HZ2 can illuminate the cruising lane 35 further away, thereby contributing to safe driving.

As shown in FIG. 10C, when the leading vehicle 30 and the oncoming vehicle 31 are not detected in the forward direction of the vehicle 3, the detection unit 9 outputs the fourth detection signal to the control unit 90, and then the control unit 90 outputs the fourth control signal to the vehicle headlamp 1 for high beam. Accordingly, the right side semiconductor-type light source 5R and the left side semiconductor-type light source 5L of the vehicle headlamp 1 for high beam are controlled to be lit on, and also the movement mechanism 70 is controlled to be driven. With this arrangement, as shown in FIG. 10A, since the radiation light from the right side semiconductor-type light source 5R and the radiation light from the left side semiconductor-type light source 5L is reflected on the right reflection surfaces 61R, 62R, and the left side reflection surface 61L, 62L (reflection surface that is a shaded area in FIG. 10A), the light is reflected from the right side reflection surfaces 61R, 62R and the left side reflection surfaces 61L, 62L. More specifically, a part of the radiation light from the right side semiconductor-type light source 5R and a part of the radiation light from the left side semiconductor-type light source 5L is reflected on the first right side reflection surface 61R and the first left side reflection surface 61L respectively. Therefore, the light distribution pattern HP1 for high beam having the first function shown in FIG. 8B and the light distribution pattern HP2 for high beam having the second function shown in FIG. 9B are radiated toward the forward direction of the vehicle 3. On the other hand, since the movable shade 7 is located at the second position, the rest of the radiation light from the right side semiconductor-type light source 5R and the rest of the radiation light from the left side semiconductor-type light source 5L enters the second right side reflection surface 62R and the second left side reflection surface 62L (reflection surface that is a shaded area in FIG. 11A) respectively, and then is reflected on the second right side reflection surface 62R and the second left side reflection surface 62L respectively. Therefore, the light distribution pattern HP3 for high beam having the third function shown in FIG. 11B is radiated toward the forward direction of the vehicle 3.

As shown in FIG. 10B, the light distribution pattern HP1 for high beam having the first function providing the left side vertical cutoff line CL4 and the first hot zone HZ1 (refer to FIGS. 8A, 8B, 8C), the light distribution pattern HP2 for high beam having the second function providing the left side vertical cutoff line CL5 and the second hot zone HZ2 (refer to FIGS. 9A, 9B, 9C), and the light distribution pattern HP3 for high beam having the third function providing the third hot zone HZ3 (refer to FIG. 11A, 11B). are radiated toward the forward direction of the vehicle 3. As a result, as shown in FIG. 10C, the light distribution pattern HP1 for high beam having the first function, light distribution pattern HP2 for high beam having the second function, and the light distribution pattern HP3 for high beam having the third function are radiated from the vehicle headlamp 1 for high beam toward the forward direction of the vehicle 3. The light distribution pattern LP for low beam is radiated from the vehicle headlamp 2 for low beam toward the forward direction of the vehicle 3. With this arrangement, the cruising lane 35 and the opposite lane 36 can be illuminated further away, and also the wide area up to the road shoulder 32 of the cruising lane side and the road shoulder 33 of the opposite lane side can be illuminated, thereby contributing to safe driving.

Herein, when detecting that the vehicle 3 turns right/left, the steering angle sensor outputs the detection signal to the control device. When inputting the detection signal from the steering angle sensor, the control device outputs the control signal to the swivel device 8. Based on the control signal, the swivel device 8 rotates the sub lamp unit about the vertical axis Y1 along with the vehicle 3 tuning right/left. With this arrangement, the light distribution pattern HP1 for high beam having the first function, the light distribution pattern HP2 for high beam having the second function, and the light distribution pattern HP3 for high beam having the third function that are radiated from the vehicle headlamp 1 for high beam toward the forward direction of the vehicle 3 are rotated right/left along with the vehicle 3 tuning right/left.

Further, the light adjusting control unit of the control unit 90 gradually increases and decreases the luminous intensity of the light distribution pattern HP1 for high beam having the first function, the light distribution pattern HP2 for high beam having the second function, and the light distribution pattern HP3 for high beam having the third function that are radiated from the vehicle headlamp 1 for high beam toward the forward direction of the vehicle 3.

(Effects of the Invention)

The vehicle headlamp system according to the present embodiment includes the configurations and operations described above. Its effects will be described herebelow.

The vehicle headlamp system according to the present embodiment combines the control for lighting on/off the right side semiconductor-type light source 5R, the control for lighting on/off the left side semiconductor-type light source 5L, and the control for moving the movable shade 7 to the first/second position via the control for driving/stopping the movement mechanism 70 with one another so as to radiate the luminous intensity of the light distribution pattern HP1 for high beam having the first function the light distribution pattern HP2 for high beam having the second function, and the light distribution pattern HP3 for high beam having the third function toward the forward direction of the vehicle 3.

Particularly, since the vehicle headlamp system according to the present embodiment includes a set of lamp unit including, more specifically, the light source holder 4, the right side semiconductor-type light source 5R and the left side semiconductor-type light source 5L, the right side reflection surface 61R, the right side reflection surface 62R and the left side reflection surface 61L, left side reflection surface 62L, the movable shade 7, and the movement mechanism 70. Thus, in comparison with the conventional vehicle headlamp system that requires two sets of the lighting device units and two pair of the swivel features, the vehicle headlamp system according to the present embodiment requires a less number of components, and thus downsizing, weight reduction, and cost reduction can be achieved accordingly.

Since the vehicle headlamp system according to the present embodiment, the swivel device 8 is included therein, the luminous intensity of the light distribution pattern HP1 for high beam having the first function the light distribution pattern HP2 for high beam having the second function, and the light distribution pattern HP3 for high beam having the third function can be rotated right/left along with the vehicle turning right/left. As a result, the vehicle headlamp system can reliably illuminate a winding road and an intersection toward the forward direction of the vehicle 3, thereby contributing to safe driving.

Further, the vehicle headlamp according to the present embodiment includes the light adjusting control unit (control unit 90), and thus can gradually increase and decrease the luminous intensity of the light distribution pattern HP1 for high beam having the first function, the light distribution pattern HP2 for high beam having the second function, and the light distribution pattern HP3 for high beam having the third function. As a result, when the luminous intensity of the light distribution pattern HP1 for high beam having the first function the light distribution pattern HP2 for high beam having the second function, and the light distribution pattern HP3 for high beam having the third function is switched or lit on/off, a driver and people present near the vehicle are not made uncomfortable, thereby obtaining people-friendly illumination.

Embodiments in addition to the embodiment described above will be described herebelow. According to the embodiment described above, the reflectors 6, which includes the reflection surfaces 61R, 62R, 61L, 62L, are formed in a circular shape viewed from a front face. However, according to the present invention, the reflectors, which includes the reflection surfaces, may be formed in other shapes, for example a square, a rectangular, a diamond, a triangle, and so on, in addition to the circular shape viewed from the front face.

Further, according to the embodiment described above, the solenoid is employed for the movement mechanism 70 so as to move the movable shade 7 frontward/backward in a reference optical axis "Z" direction. However, according to the present invention, another mechanism other than the solenoid, for example a motor, may be employed as the movement mechanism. In addition to moving the movable shade forward/backward in the reference optical axis direction, the movable shade may be rotated and moved about a horizontal axis, or may be rotated and moved about the reference optical axis.

Furthermore, according to the embodiment described above, the swivel device 8 is included. However, according to the present invention, the swivel device 8 may not be included.

Moreover, according to the embodiment described above, the semiconductor-type light sources 5R, 5L are light-adjusted and controlled by the light adjusting control unit. However, according to the present invention, the semiconductor-type light source may not be light-adjusted and controlled.

What is claimed is:

1. A vehicle headlamp that radiates a light distribution pattern for high beam having a plurality of functions toward a forward direction of a vehicle, the vehicle headlamp comprising:

- a light source holder formed of a vertical wall;
- a right side semiconductor-type light source and a left side semiconductor-type light source that are respectively disposed on both right and left side faces of the light source holder;
- a right side reflection surface that is formed of a free curved face of a parabola system and whose focal point is located at or near a light emitting center of the right side semiconductor-type light source;
- a left side reflection surface that is formed of a free curved face of a parabola system and whose focal point is located at or near a light emitting center of the left side semiconductor-type light source;
- a movable shade that is movably disposed between a first position and a second position, cuts off and passes a part of radiation light from the right side semiconductor-type light source and a part of radiation light from the left side semiconductor-type light source; and
- a movement mechanism that moves the movable shade between the first position and the second position, wherein,
- the right reflection surface includes a first right side reflection surface for reflecting the radiation light from the right side semiconductor-type light source as a first light distribution pattern for high beam toward the forward direction of the vehicle and a second right side reflection surface for reflecting the radiation light from the right side semiconductor-type light source as a second light distribution pattern for high beam toward the forward direction of the vehicle;
- the left reflection surface includes a first left side reflection surface for reflecting the radiation light from the left side semiconductor-type light source as a third light distribution pattern for high beam toward the forward direction of the vehicle and a second left side reflection surface for reflecting the radiation light from the left side semiconductor-type light source as a fourth light distribution pattern for high beam toward the forward direction of the vehicle;
- when the movable shade is located at the first position, the radiation light incident from the right side semiconductor-type light source to the second right side reflection surface and the radiation light incident from the left side semiconductor-type light source to the second left side reflection surface is cut off by the movable shade; and
- when the movable shade is located at the second position, the radiation light from the right side semiconductor-type light source enters the second right side reflection surface, and also the radiation light from the left side semiconductor-type light source enters the second left side reflection surface.

2. The vehicle headlamp according to claim 1, further comprising a swivel device that rotates about a vertical axis the light source holder, the right side semiconductor-type light source, the left side semiconductor-type light source, the right side reflection surface, the left side reflection surface, the movable shade, and the movement mechanism.

3. The vehicle headlamp according to claim 1, further comprising a light adjusting control unit that light-adjusts and controls the right side semiconductor-type light source and the left side semiconductor-type light source so as to gradually increase and decrease luminous intensity of the light distribution patterns for high beam.

4. A vehicle headlamp apparatus comprising:

- a vehicle headlamp according to claim 1;
- a detection unit that detects a leading vehicle and an oncoming vehicle in a forward direction of a vehicle; and
- a control unit that outputs a control signal to the vehicle headlamp based on a detection signal from the detection unit.

* * * * *